United States Patent
Wagner

(10) Patent No.: US 6,811,206 B2
(45) Date of Patent: Nov. 2, 2004

(54) REAR TRUNK LID FOR A CONVERTIBLE VEHICLE

(75) Inventor: Tobias Wagner, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/659,988

(22) Filed: Sep. 11, 2003

(65) Prior Publication Data

US 2004/0046410 A1 Mar. 11, 2004

Related U.S. Application Data

(63) Continuation-in-part of application No. PCT/EP03/02797, filed on Mar. 18, 2003.

(30) Foreign Application Priority Data

Mar. 25, 2002 (DE) .......................................... 102 13 337

(51) Int. Cl.[7] .................................................. B60J 7/00
(52) U.S. Cl. ..................................... 296/136.05; 296/76
(58) Field of Search ............................. 296/76, 136.04, 296/136.05, 136.06; 49/193

(56) References Cited

U.S. PATENT DOCUMENTS 6,186,577 B1 * 2/2001 Guckel et al. ......... 296/107.07
6,250,707 B1 * 6/2001 Dintner et al. ................ 296/76
6,325,445 B1 * 12/2001 Schenk ................... 296/107.08
6,702,361 B2 * 3/2004 Russke ................... 296/107.08
6,705,662 B2 * 3/2004 Sande .................... 296/107.08
6,715,819 B2 * 4/2004 Weissmueller ......... 296/107.08

FOREIGN PATENT DOCUMENTS

| DE | 44 45 944 | 4/1996 |
| DE | 195 16 876 | 11/1996 |
| DE | 199 32 500 | 2/2001 |
| DE | 299 16 002 | 3/2001 |
| DE | 100 51 616 | 5/2001 |

* cited by examiner

Primary Examiner—Stephen Gordon
(74) Attorney, Agent, or Firm—Klaus J. Bach

(57) ABSTRACT

In a support arrangement for a rear trunk lid of a convertable vehicle supported on a vehicle body so as to be selectively pivotable about a front pivot joint and a rear pivot joint, releasable trunk lid locking structures are provided at both ends of the trunk lid for selectively locking the front or rear end to the respective pivot joint and a control element is provided for operating the releasable locking structures in such a way that, upon locking of the front pivot joint, a rear actuator connected between the trunk lid and the vehicle body is moved into a non-functional position in which it is disengaged from the vehicle body and, upon unlocking of the front pivot joint, the rear actuator is moved to a functional position, in which it is engaged with the vehicle body.

12 Claims, 3 Drawing Sheets

REAR TRUNK LID FOR A CONVERTIBLE VEHICLE

This is a Continuation-In-Part application of international application PCT/EP03/02797 filed Mar. 18, 2003 and claiming the priority of German application 102 13 337.9 filed Mar. 25, 2002.

BACKGROUND OF THE INVENTION

The invention relates to a trunk lid for a convertible vehicle which can be pivoted selectively about a front pivot axis disposed adjacent the interior vehicle space and a rear pivot axis disposed at the rear end of the vehicle and with a lifting structure and a releasable locking structure at the front end and at the rear end of the trunk lid.

DE 196 16 876 C1 discloses a rear trunk lid which covers a rear trunk of a vehicle and comprises a support frame, which is pivotally connected to the vehicle body and the lid is pivotally connected to the support frame. The pivot joints of the support frame and of the trunk lid are arranged at the rear and the front ends of the rear trunk lid so that the lid can be pivoted open from its rear end for accessing the trunk and also from its front end adjacent the interior vehicle space to provide a passage for the transfer of the removable vehicle roof for deposition in the trunk. For opening the trunk, the support frame remains in its rest position and only the trunk lid is pivoted about its pivot axis adjacent the interior vehicle space. For the transfer of the vehicle roof into the trunk however the lid remains locked to the support frame and both components are pivoted open about the rear pivot axis.

The two-part rear lid structure comprising the support frame and the lid is relatively heavy and has to be raised by an actuating element in order to open the trunk for the transfer of the vehicle roof between its closed and its open positions. Accordingly, also the actuating element must be relatively strong and large.

DE 199 32 500 A1 discloses a rear trunk lid which, for loading or unloading the trunk, can be raised by pivoting about a four-link pivot joint disposed at the front end of the trunk lid adjacent the interior space of the vehicle and which can also be opened by pivoting about a rear four-link pivot joint disposed at the rear end of the trunk for depositing the vehicle roof in the trunk. In the areas of the two four-link pivot joints, there are provided locking arrangements by way of Which one of the four link joints can be released or, respectively, locked in order permit the lifting of one end of the trunk lid while the other is safely locked. The locking mechanisms are operated independently of each other. For an automatic operation, two separate operating mechanisms are therefore required each of which actuates one of the locking mechanisms. With manual operation, the respective locking mechanisms must both be operated individually by hand.

An operating mechanism, which operates the locking mechanisms on the front and in the rear area of the trunk lid, is not disclosed in DE 199 32 500 A1.

Also, DE 299 16 002 U1 discloses a vehicle with a rear trunk lid which can be opened by pivoting it about its front end and also by pivoting it about its rear end. In the area of the front end, the rear lid is mounted to the vehicle by way of a four-link operating mechanism, whereas, at its rear end, the lid is supported by a pivot joint, about which it can be pivoted open for the deposition of the vehicle roof in the rear trunk. For Securely locking the rear lid, the rear pivot joint is a lockable hinge. The locking hinge can be released to permit opening of the trunk lid from the back for loading the trunk. As described on page 8, third paragraph of DE 299 16 002 U1, the locking hinge is unlocked in a way which is not described but which—in accordance with the state of the art—occurs either manually or by means of an operating member. In order to prevent accidental lifting of the front of the rear trunk lid when the trunk is open, mechanical guide means are provided as described on page 6, second paragraph, which are retained by the hydraulic operating mechanism in a locked state when the front edge of the rear trunk lid is raised for moving the vehicle roof into the storage compartment.

The locking arrangements or, respectively, hinge arrangements at the front and rear ends of the trunk lid are not interconnected or in any way functionally coupled. The operating element merely holds the front hinge arrangement in a locking position but does not in any way act on the rear hinge arrangement.

It is the object of the present invention to provide a rear trunk lid for a convertible vehicle, which is simple and of relatively low weight and which includes an automatic operating mechanism for opening the trunk lid to permit the transfer of the roof into, and out of, the rear trunk.

SUMMARY OF THE INVENTION

In a support arrangement for a rear trunk lid of a convertible vehicle supported on a vehicle body so as to be selectively pivotable about a front pivot joint and a rear pivot joint, releasable trunk lid locking means are provided at both ends of the trunk lid for selectively locking the front or rear end to the respective pivot joint and a control element is provided for operating the releasable locking means in such a way that, upon locking of the front pivot joint, a rear actuator connected between the trunk lid and the vehicle body is moved into a non-functional position in which it is disengaged from the vehicle body and, upon unlocking of the front pivot joint, the rear actuator is moved to a functional position, in which it is engaged with the vehicle body.

The pivot hinges at the front end of the trunk lid adjacent the vehicle interior and at the rear end of the trunk are mounted directly to the trunk lid so that no support frame for the trunk lid is needed. The arrangement is therefore relatively lightweight and, as a result requires only relatively small and light weight lifting or operating mechanisms for operating the trunk lid.

Furthermore, the locking mechanisms at one end of the trunk lid is provided with an actively adjustable control element, which, on one hand, actuates a locking member of this locking mechanism and which, on the other hand, is connected to an actuator at the opposite end of the trunk lid for moving it between a functional position and a non-functional position. In the functional position, the trunk lid can be pivoted by the actuator relative to the vehicle body but in the non-functional position, the pivot bolt of the actuator hinge is disposed outside its joint so that no forces can be transmitted. The control element, which locks or, respectively, releases the locking mechanism also moves the pivot joint between its functional and non-functional positions. In the non-functional position of the pivot joint, the respective end of the rear trunk lid can be raised. It is possible in this way to lock and release the locking mechanism at one side of the trunk lid and also the actuator pivot joint at the opposite side with only one active control element. Depending on the desired opening movement of the trunk lid, the respective locking arrangement is engaged and the opposite pivot joint is released, whereupon the rear trunk lid can be pivoted open about the pivot axis of the engaged pivot joint. Vice versa, upon release of the other locking mechanism, the opposite pivot joint becomes functional whereby the trunk lid becomes pivotable about this pivot joint. Since at the same time, the opposite locking mechanism has been released the trunk lid can now be opened in the opposite manner that is from the opposite end.

In an expedient embodiment, the release of the locking structure and transfer of the pivot joint into its functional position occur with an actuation of the control element in the same control direction. Reversal of the movement of the control element is not necessary in this arrangement.

In an advantageous embodiment of the invention, the movable pivot joint is coupled with the actuator by way of a pull string or cable. The pull string or cable is a simple design solution for the transfer of a force from the control element at one end of the trunk lid to the movable pivot joint at the other end of the trunk lid.

The movable pivot joint is preferably arranged next to another locking mechanism of the trunk lid, wherein the other locking mechanism is automatically or normally operable. If the other locking mechanism is arranged at the rear end of the trunk lid, a manual operating mechanism for opening the trunk from the rear end for loading and unloading luggage may be sufficient.

In an alternative embodiment, no additional locking mechanism is provided but locking occurs by moving the actuator pivot joint to its functional position. In the functional position of the pivot joint basically a pivot movement about the pivot axis of this pivot joint would be possible but the trunk lid can be held down by the actuator and thereby fulfills a locking function.

In a preferred embodiment, the actuator is a lever pivotally supported at the rear trunk lid. At one end, the lever is operatively connected to the control element and at the opposite end it is provided with a bearing structure, which in the functional position, engages a body-mounted bolt forming a movable pivot joint. By way of the lever ratios, the lever force or, respectively, the lever travel distance of the movable pivot joint can be controlled. Preferably, however, the lever is in the form of an extendable actuator which is extended particularly in its functional position during raising of the opposite end of the trunk lid in order to facilitate, in addition to the rotation about the adjustable pivot joint, also a pivot movement about a pivot axis of the adjacent trunk lid pivot joint which includes a locking structure. Furthermore, by extension of the actuator, the trunk lid can be raised so that a large opening becomes available.

For the raising of the trunk lid, it is advantageous if a lifting device, particularly a passive spring element is provided which is connected to the trunk lid between the opposite pivot joints. A lifting force is applied to the trunk lid to facilitate lifting of the trunk lid at its released end for pivoting it open about the pivot axis of the opposite pivot joint.

The invention will become more readily apparent from the following description of preferred embodiments thereof shown, by way of example only, in the accompanying drawings.

DETAILED DESCRIPTION OF A PREFERRED EMBODIMENT

Figure 1:
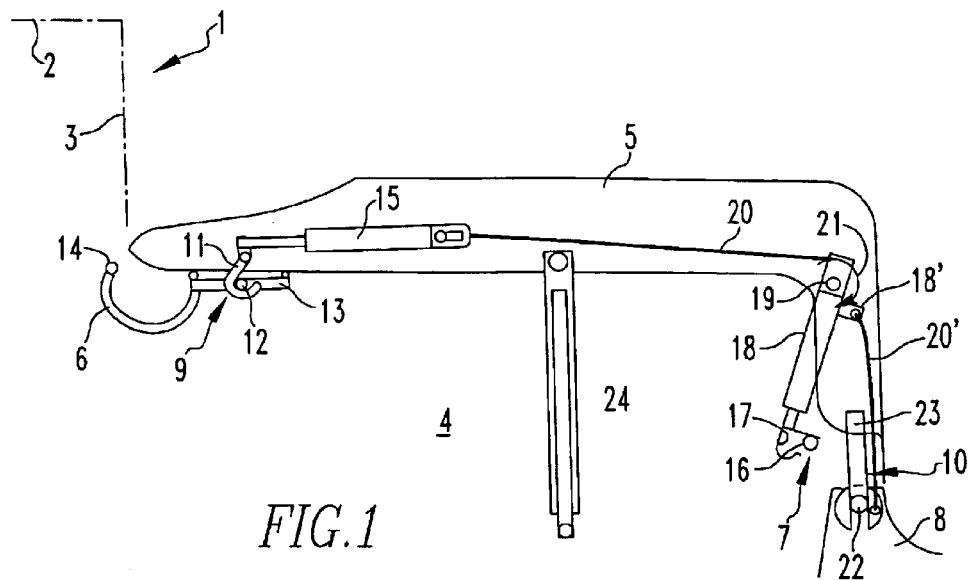
FIG. 1 shows a rear trunk lid for a convertible vehicle with a movable vehicle roof, the rear trunk lid being shown in a closed position.

In the following figure, identical components are designated by the same reference numerals.

The vehicle roof 1 indicated in FIG. 1 is a hardtop vehicle roof which includes at least two rigid roof parts 2 and 3 which are movable between the closed position as schematically indicated in FIG. 1, in which they cover a vehicle interior space, and a storage position, in which the roof parts are deposited in a storage area within the rear vehicle trunk 4. The invention however is also useable in connection with a soft top roof including a support linkage and a roof top cover material supported by the support linkage.

The trunk 4 is closed by a trunk lid 5, which is pivotally supported on the vehicle body by a front pivot joint 6, which is disposed adjacent the vehicle interior as well as a rear pivot joint 22, which is disposed at the rear end of the vehicle body 8. The front pivot joint 6 and the rear pivot joint 22 have pivot axes which extend transverse to the longitudinal vehicle direction and facilitate opening of the trunk lid 5 by pivoting the trunk lid 5 either about the front pivot joint 6 whereby the rear end of the trunk lid 5 is raised or opening of the trunk lid by pivoting it about the axis of the rear pivot joint 22, whereby the front edge of the trunk lid 5 adjacent the vehicle interior is raised.

The trunk lid 5 is provided with two locking structures 9 and 10, one of which (9) is located adjacent the front pivot joint 6 and the other (10) is located adjacent the rear pivot joint 22. For raising the rear end of the trunk lid 5, the rear locking structure 10 is unlocked, for raising the front edge of the trunk lid 5, the front locking structure 9 is unlocked. The front locking structure 9 comprises a hook 11 which is pivotally supported on the trunk lid 5 and which, in a locking position, engages a bolt 12 mounted on the vehicle body, particularly on a leg 13 of the pivot joint 6. The leg 13 is part of the front pivot joint 6 which is in the form of a goose neck hinge having a vehicle body side pivot axis 14. The hook 11 of the locking structure 9 is controllable by way of an actively operable control element 15, which may be specifically in the form of a hydraulic control cylinder 15 supported on the trunk lid 5. The hydraulic control cylinder 15 is connected to one end of the hook 11 so that it can pivot the hook 11 about its pivot axis on the trunk lid 5 between a locking an a release position. The control cylinder 15 is supported on the trunk lid 5 so as to be movable in a longitudinal direction along its force application line.

The rear pivot joint 22 is preferably a releasable rotary joint, which engages a bolt 22' when the trunk lid 5 is closed. By rotating a locking member of the rotary joint the trunk lid is then firmly but still pivotally held down. At the rear end of the trunk there is also an actuator 18 connected with one end to the trunk lid 5 so as to be pivotable about an axis 19 and connected at its other end to the vehicle body by a pivot joint 7. The actuator 18 is pivotable between a functional position in which is connected by the pivot joint to the vehicle body and a non-functional position in which the actuator is disconnected from the vehicle body so that pivoting movement of the trunk lid that is raising of the rear end of the trunk lid is possible. The adjustment of the rear pivot joint 7 is achieved by adjusting a bearing support 17 of the pivot joint between an effective position in which it engages a vehicle-body mounted shaft 16 and a position in which the shaft 16 is disengaged. The actuator 18 is expediently a longitudinally extendable hydraulic cylinder and piston structure.

At the end of the lever-like actuator 18 opposite the bearing support 17 one end of a force transfer member such as a cable or rope 20 is connected to the actuator 18. The other end of the force transfer member 20 is connected to the control element 15. An actuating movement of the control element 15 is transferred by the force transfer member 20 to the actuator 18 whereby the actuator 18 is pivoted about its pivot axis 19 at the rear trunk lid 5. Instead of a rope or cable another transfer element such as a transfer rod may be employed.

The actuator 18 is biased by a spring element 20*a* in a pivot direction as indicated by the arrow 21 in FIG. 1 whereby it is moved into a non-functional position in which it is disengaged from the pivot joint 7. Upon actuation of the control element 15, the actuator 18 is pivoted against the force of the spring element 20*a* about its pivot axis 19, whereby the pivot joint 7 is moved into a functional position in which the vehicle body-supported shaft 16 is received in the bearing support 17 of the actuator 18.

The rear second locking structure 10 at the rear end of the vehicle is in the form of a rotary lock and comprises a bolt 22, which is connected to the vehicle body and which is firmly engaged in the locking positions by a locking yoke 23, which is firmly connected to the trunk lid 5. For unlocking the locking yoke 23 is disengaged from the bolt 22. In the locked position, the locking yoke 23 is pivotable about the bolt 22.

The rotary lock may also be operated by the hydraulic control cylinder 15. To this end the rotary locking plate 22' at the free end of the yoke 23 is connected to a projection 18' of the actuator 18 by an operating rod 20' so that, upon pivoting of the actuator 18 out of engagement with the shaft 16, the rotary plate 22' is rotated to a position, in which its release slots are aligned so that it can move out of engagement with the body-mounted bolt 22.

To facilitate raising of the rear trunk lid, a lifting mechanism is provided which is preferably in the form of a passive spring element and is shown in the exemplary embodiment as a gas spring element 24. The gas spring element is supported on the vehicle body and engages the trunk lid 5 in an area between the pivot joints 6 and 7.

Figure 2:
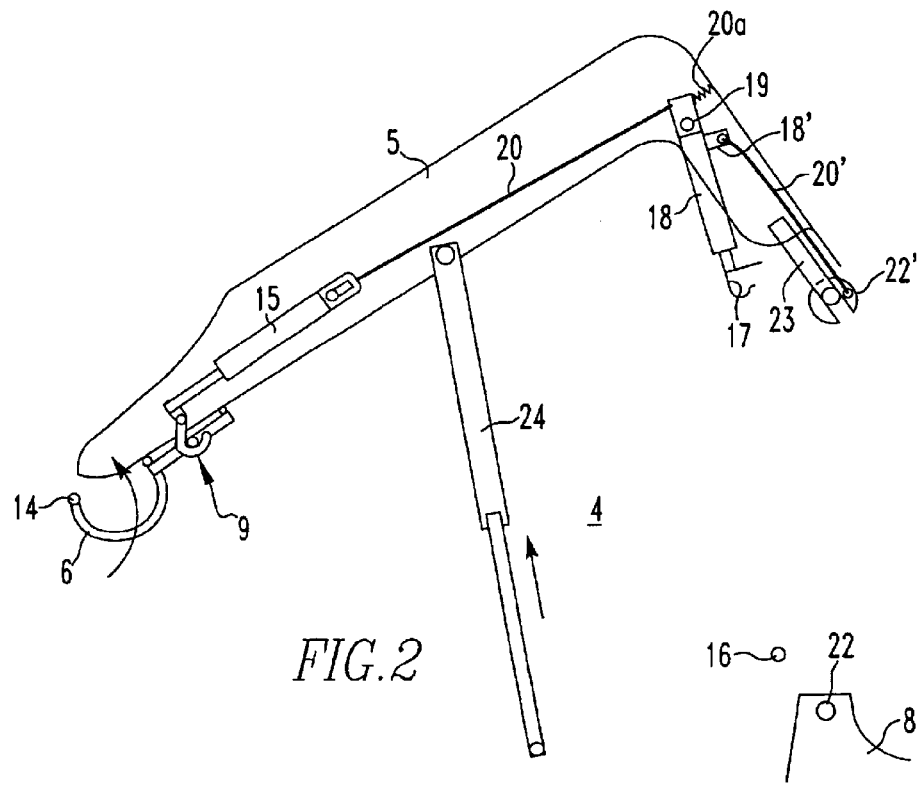
FIG. 2 shows the trunk lid in an open position, in which the rear end of the trunk lid is raised.

FIG. 2 shows the trunk lid 5 with the rest end raised that is pivoted open about the pivot axis 14 of the front pivot joint 6 so that the trunk 4 is accessible from the rear end of the vehicle. For raising the trunk lid, the rear locking structure is unlocked which may be achieved either manually or automatically such that the locking yoke 23 of the rear locking structure is disengaged from body-mounted bolt 22. Also, the actuator pivot joint 7 is in the non-functional position in which the shaft 16 is not engaged by the bearing support 17 of the actuator 18. The front control element 15 as well as the rear actuator 18 are not actuated. The raising of the trunk lid is supported by the gas spring 24.

Figure 3:
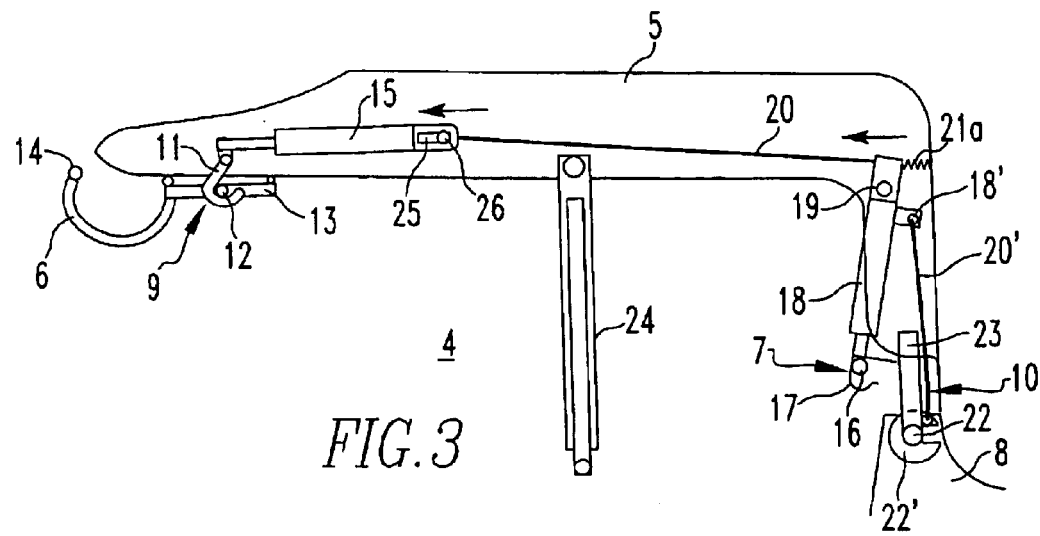
FIG. 3 shows the trunk lid in a closed position with the control element for the conversion of a rear pivot joint to become functional being actuated.
Figure 4:
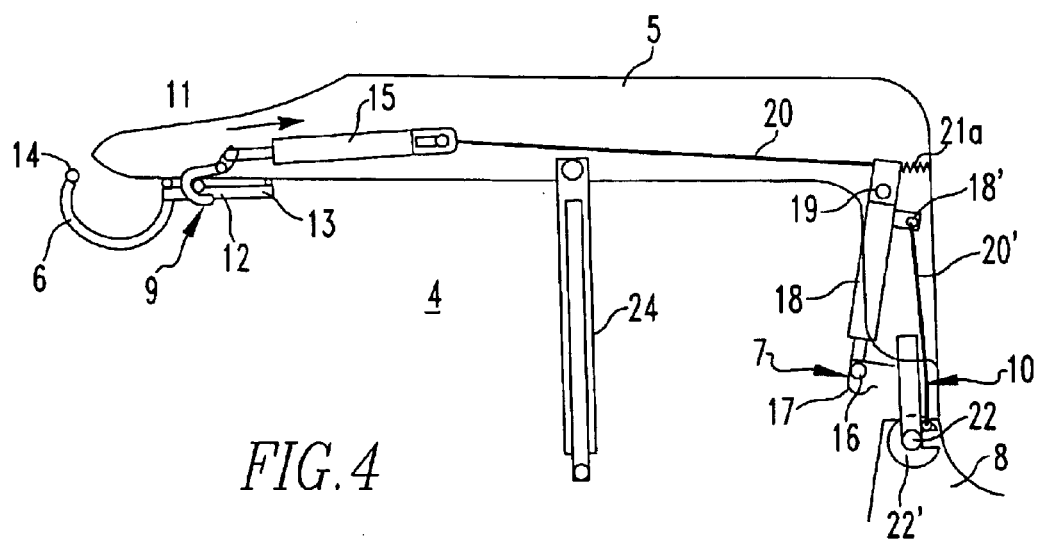
FIG. 4 shows the arrangement in accordance with FIG. 3 in a further advanced state wherein the locking structure for the pivot joint adjacent the vehicle interior is released.
Figure 5:
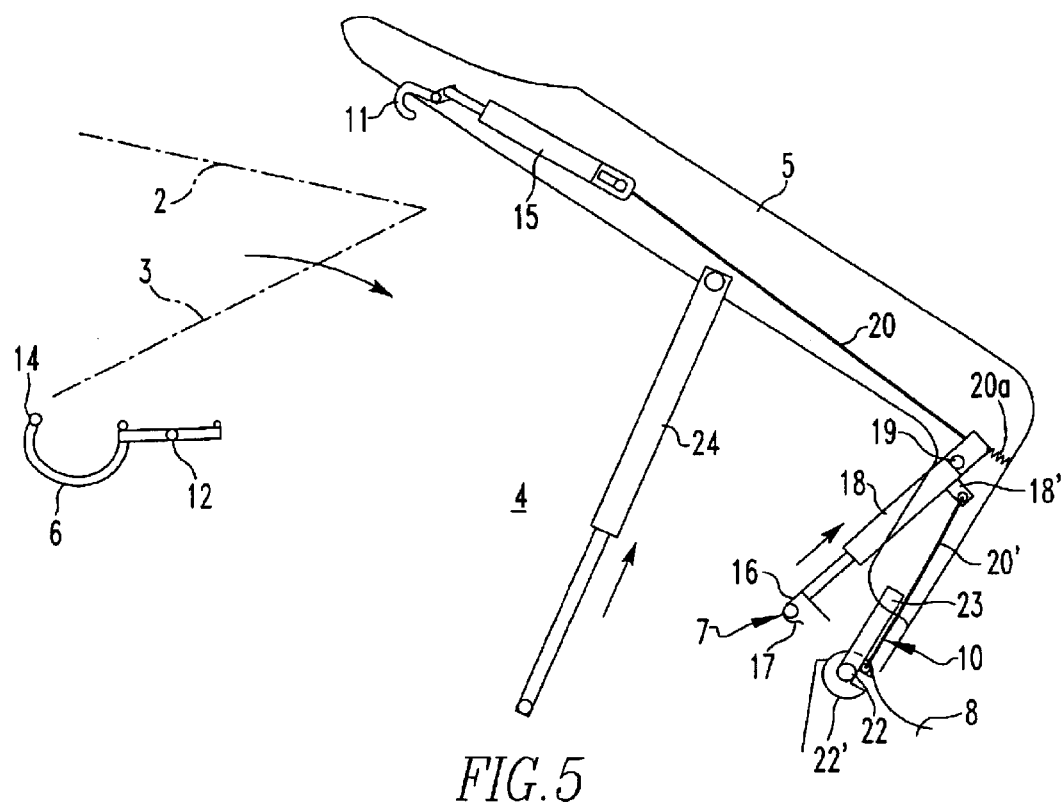
FIG. 5 shows the trunk lid in a position in which its front end is raised to provide an opening for the transfer of the vehicle roof into, or out of, the trunk.

FIGS. 3 to 5 show various stages during unlocking and raising of the rear trunk lid 15 for providing a transfer space for depositing the vehicle roof parts 2 and 3 in the trunk 4 or the removal of the roof parts 2 and 3 from the trunk 4. In order to facilitate the raising of the front edge of the trunk lid, first, the control element 15 is actuated as indicated in FIG. 3. The control element 15 is provided at its rear end with an elongated opening 25 in which a mounting part 26 of the cable 20 supported. Upon retraction of the control cylinder of the control element 15, the mounting part 26 is retracted until the mounting part 26 is engaged by the rear end wall of the elongated opening 25. Then further movement of the control cylinder is transferred by way of the cable 20 to the rear actuator 18, which is pivoted thereby about its pivot axis 19 in opposition to the force of a spring 20*a*. As a result of the pivot movement of the actuator 18, the bearing support 17 of the adjustable rear pivot joint 17 is moved into a position in which it engages the vehicle body mounted shaft 16 whereby the pivot joint 7 is placed into a functional position. Also the locking plate 22' is rotated by the operating rod 20' so as to firmly engage the body-mounted locking bolt 22.

With further retraction of the control cylinder of the front control element 15, the front locking structure 9 is actuated and a release force is applied to the hook 11 which is pivoted thereby about its pivot axis on the trunk lid 5. As a result, the hook 11 is pivoted out of engagement with the locking bolt 12 mounted on the leg 13 of the front pivot joint 6, see FIG. 4. The front locking device 9 is now unlocked so that the front edge of the trunk lid 5 can be raised.

The rear trunk lid is pivoted open about the pivot axis of the bolt 22 of the rear trunk lid pivot joint and the trunk lid is raised supported by the force of the spring 24. When the front end of the trunk lid 5 is fully raised, an opening is provided for depositing the vehicle roof in the trunk or, respectively, for lifting the vehicle roof out of the trunk. As apparent also from FIG. 5, upon raising the front end of the vehicle trunk lid 5, the closing yoke 23 of the rear pivot structure 10 is pivoted about the vehicle body-mounted bolt 22. As the trunk lid 5 is connected to the vehicle body also by way of the shaft 16 and the actuator 18, which are arranged in spaced relationship from the bolt 22 the control cylinder of the actuator 18 is extended so that the trunk lid 5 can be pivoted and moved longitudinally with respect to the vehicle body-mounted shaft 16. With respect to the vehicle body-mounted bolt 22 of the rear locking structure 10, the trunk lid 5 is only pivoted.

For the closing of the trunk lid 5, the control element of the actuator 18 is retracted against the force of the gas spring 24. Basically, the front end of the trunk lid could be opened also solely by means of the actuator 18. During closing of the trunk lid 5 from its open position with the front end raised, the control cylinder of the front control element 15 is returned to its extended position whereby the hook 11 is returned to its locking position. In addition, the tension in the cable 20 is eliminated so that the actuator 18 is pivoted back about the pivot axis 19 at the trunk lid 5, because of the force of the spring 20*a* effective thereon. As a result the actuator 18 with the pivot joint 7 is moved to its non-functional position in which the shaft 16 and the bearing support 17 are no longer in engagement. Also the rotary plate 22' is rotated to a locking position so that the trunk lid 5 is locked closed.

What is claimed is:

1. A rear trunk lid for a convertible vehicle supported on a vehicle body so as to be selectively pivotable about a front pivot joint (6) disposed at a front end of said trunk lid (5) adjacent an interior vehicle space and a rear pivot joint (22) disposed at a rear end of the trunk lid (5), including lifting means (24) for applying a lifting force to said trunk lid (5), releasable locking means (9), (17), (22') at both, the front and rear ends of said trunk lid (5) for locking the trunk lid (5) to the vehicle body, said releasable locking means including a control element (15) for operating said releasable locking means, a locking member (11) associated with said front pivot joint (6) and connected to said control element for moving said locking member (11) between a locking and a release position, said control element (15) being also operatively connected to a rear actuator (18) releasably connected between said trunk lid and said vehicle body for moving said rear actuator (18) between a functional position, in which it is in engagement with said vehicle body and non-functional position in which it is disengaged from said vehicle body.

2. A rear trunk lid according to claim 1, wherein said control element (15) is connected to said locking member (11) and to said rear actuator (18) in such a way that, upon actuation of said control element (15) in one sense, said locking member (11) is moved to a release position and at the same time said rear actuator (18) is moved into its functional position and, upon actuation of said control element (15) in an opposite sense, said locking member (11) is moved to a locking position and said rear actuator (18) is moved to its non-functional position.

3. A rear trunk lid according to claim 1, wherein said control element (15) and said actuator (18) are arranged, in a longitudinal vehicle direction, at opposite ends of said trunk lid (5).

4. A rear trunk lid according to claim 3, wherein said rear actuator (18) is arranged at the rear end of the trunk lid (5).

5. A rear trunk lid according to claim 4, wherein said rear actuator (18) is pivotally supported on said trunk lid (5) and operatively connected to said control element (15) by an operating cable (20).

6. A rear trunk lid according to claim 1, wherein said trunk lid (5) is supported at its rear end on the vehicle body by means of a releasable pivot joint (10).

7. A rear trunk lid according to claim 6, wherein said releasable pivot joint (10) includes a rotor lock (22').

8. A rear trunk lid according to claim 1, wherein said actuator (18) is pivotally supported on said trunk lid (5) so as to form a double-arm lever, said control element (15) is operatively connected to one end of said actuator (18) and another end of said actuator (18) forms a bearing receiver (17), in which a vehicle body-mounted shaft (16) is received when the actuator, (18) is in its functional position.

9. A rear trunk lid according to claim 8, wherein a spring element (20a) is connected to said actuator (18), which biases said actuator (18) into its non-functional position.

10. A rear trunk lid according to claim 1, wherein said actuator (18) is a linearly extendable actuator.

11. A rear trunk lid according to claim 6, wherein said trunk lid lifting means is a spring rod connected to said trunk lid (5) between the pivot joints at opposite ends of the trunk lid (5) for providing a lifting force to facilitate pivoting of the trunk lid (5) about either of its front and rear pivot joints.

12. A rear trunk lid according to claim 7, wherein said rotor lock includes a locking member (22') which is operatively connected to said actuator (18).

* * * * *